Feb. 28, 1956     C. C. BAUERLEIN     2,736,465
BEVERAGE DISPENSER
Filed July 18, 1950     3 Sheets-Sheet 1
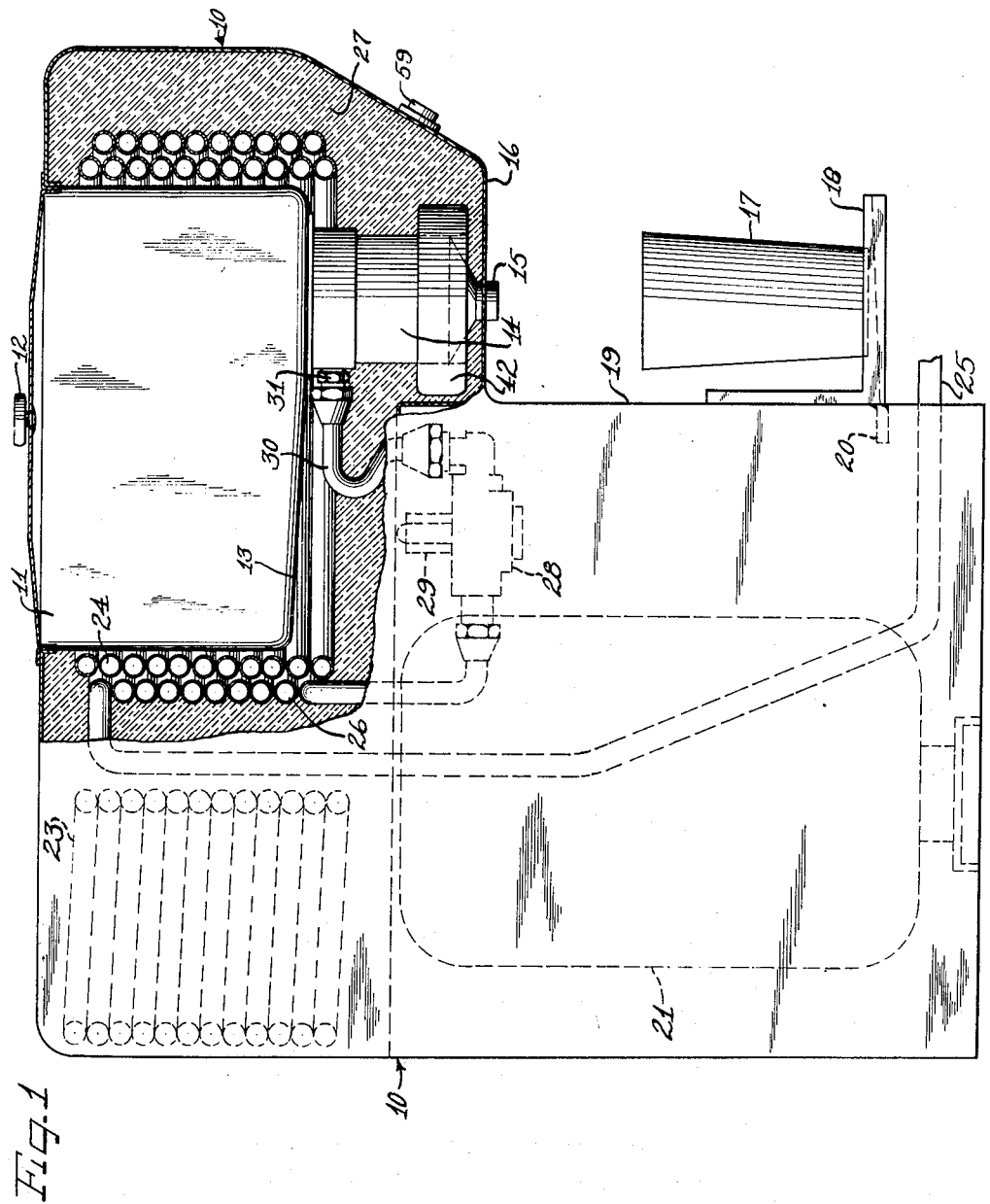
Inventor
Carl C. Bauerlein
by    Attys

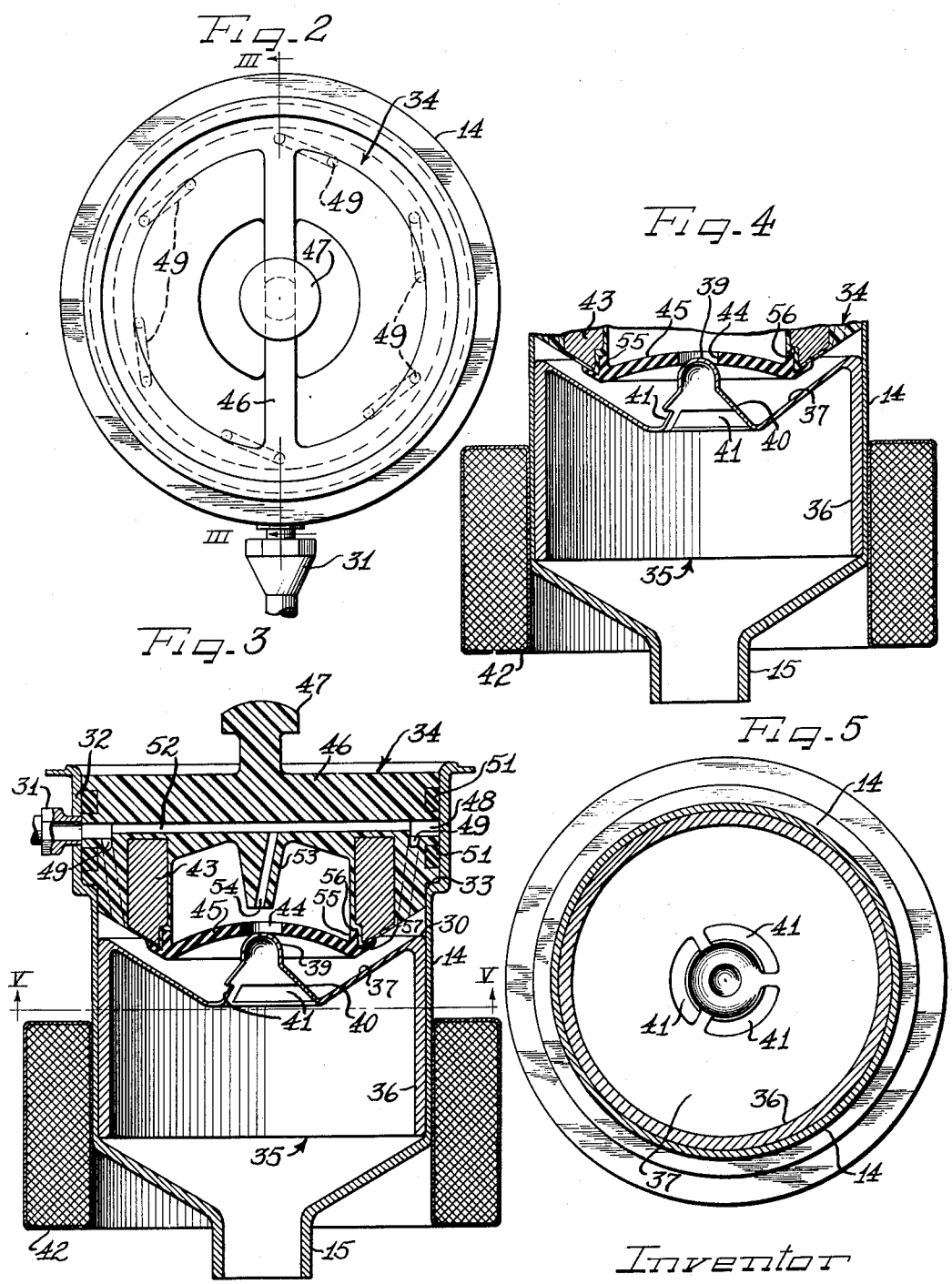

Feb. 28, 1956 — C. C. BAUERLEIN — 2,736,465
BEVERAGE DISPENSER
Filed July 18, 1950 — 3 Sheets-Sheet 3
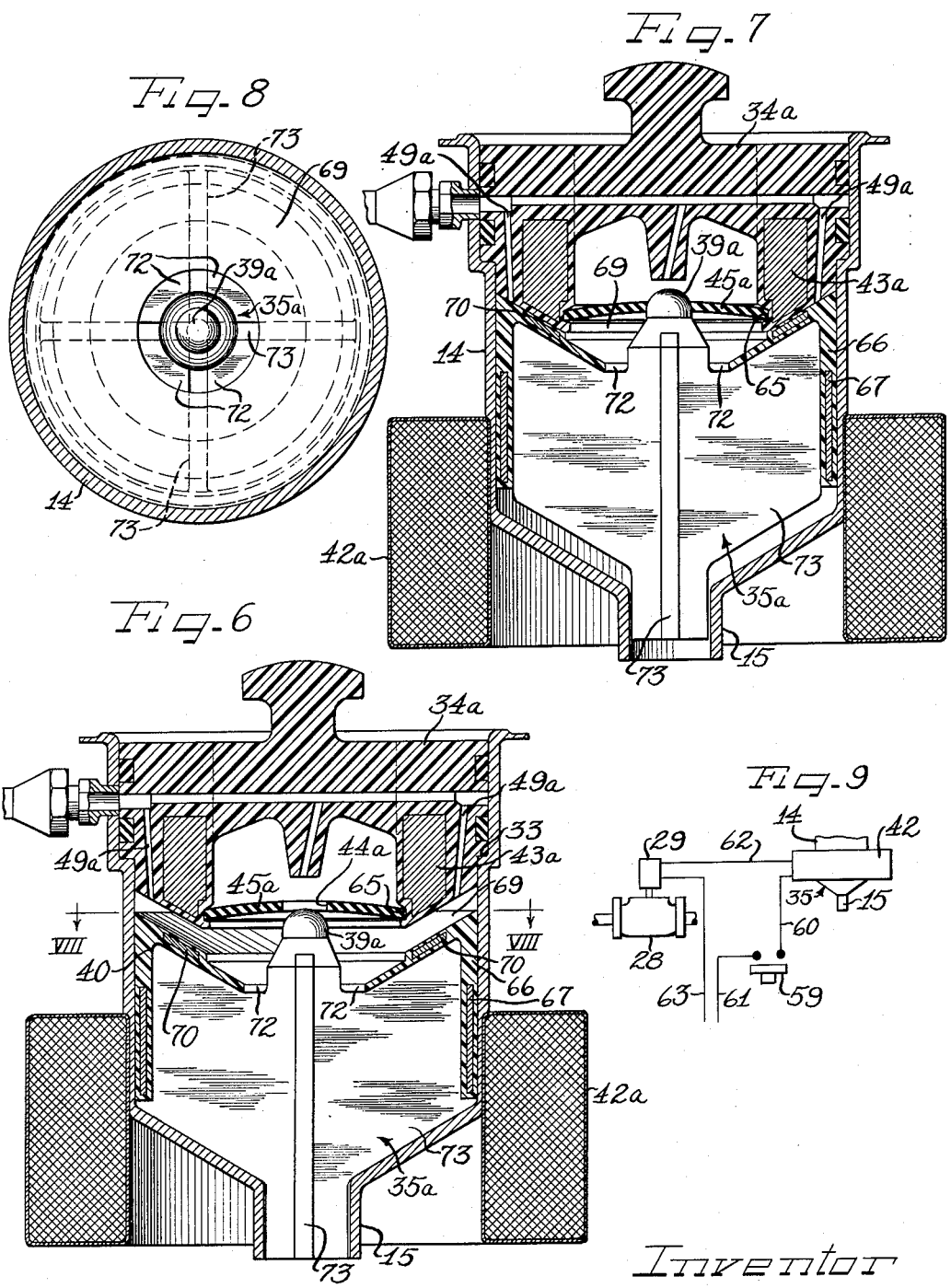
Inventor
Carl C. Bauerlein United States Patent Office 2,736,465
Patented Feb. 28, 1956

2,736,465

BEVERAGE DISPENSER

Carl C. Bauerlein, Mukwonago, Wis., assignor to The Dole Valve Company, Chicago, Ill., a corporation of Illinois Application July 18, 1950, Serial No. 174,441

19 Claims. (Cl. 222—129.2)

This invention relates to dispensers for drinks and more particularly to a dispenser for concentrates, such as frozen fruit juices and the like, diluting the juice with sufficient water to obtain a palatable juice having the natural content of water found in fresh fruits.

In the dispensing of concentrates, such as frozen orange juice and the like, the concentrate must be diluted with a measured amount of water to obtain a final uniformly mixed juice having the natural content of water found in the juice of the fresh fruit, usually a volume of three-fourths water to a volume of one-fourth juice. Since the frozen concentrate may be in the dispenser from day to day, bacterial growth and spoilage of the concentrate must be avoided. This is attained by the use of non-corrosive materials in the dispenser and designing the dispenser so that all parts may readily be cleaned and observed and by maintaining the concentrate at a sufficiently low temperature to prevent bacterial growth, but high enough to permit the concentrate to flow relatively freely for mixing and dispensing purposes.

It is further desirable that the water mixing with the fruit juice be cold and be maintained cold with similar cooling coils that keep the concentrate at the desired temperature, but that the temperature of the water be higher than the temperature of the juice or concentrate in order to avoid freezing of the water.

The dispenser must also conform to the standards of the various health departments, and in order to do this it is desirable that the mixing valve and chamber be self-cleaning and that all parts of the valve be so proportioned that they may readily be removed without the use of tools and cleaned by hand and have no sharp edges where pulp or sediment may lodge and breed bacteria.

It is, therefore, an object of my invention to provide a dispenser having the foregoing desirable qualities by arranging the dispenser with a view toward utmost simplicity and cleanliness to measure and mix uniform quantities of juice concentrate and water and to maintain the concentrate at such a temperature that it will readily flow, but sufficiently low to insure against spoilage, and to maintain the water cold, but sufficiently high to prevent freezing.

Another object of my invention is to provide a dispenser operable to supply a uniformly mixed natural juice irrespective of variations in head of the concentrate or water supplied for mixing purposes.

Another object of my invention is to provide a new and improved dispenser of a simplified and novel arrangement insuring against the breeding of bacteria in the concentrate or mixing chamber thereof.

A further object of my invention is to provide a novel dispenser uniformly diluting concentrates with a measured volume of water to the consistency, regardless of the head of concentrate in the dispenser.

A further object of my invention is to provide a simpler valve than formerly, eliminating all mechanical connections and springs, by the use of magnets urging the valve closed and positively opening the valve.

A still further object of my invention is to provide a novel and improved form of valve for dispensers for concentrates so arranged that the parts thereof may readily be removed by hand for cleaning without the use of tools.

A further object of my invention is to provide a mixing and flow characterizing valve for measuring and diluting concentrates, wherein a flexible annulus forms the orifice and seat of the valve and cooperates with the valve element to deliver a uniform volume of concentrate regardless of the head of the concentrate on the annulus.

Another object of my invention is to provide a mixing and flow characterizing valve for diluting concentrates, utilizing an apertured flexible diaphragm to supply a uniform volume of concentrate regardless of the head thereon, delivering diluted liquid on the discharge side of the diaphragm, injecting a high velocity jet of liquid through the orifice of the diaphragm, aspirating the concentrate therethrough, and scavenging the valve orifice.

A further object of my invention is to provide a novel form of mixing valve delivering measured quantities of concentrate and water by the use of a mixing and flow characterizing head, delivering the concentrate through the center thereof, delivering water along the periphery thereof onto a mixing table beneath the mixing and flow characterizing head by controlling the flow of concentrate by a valve element extending upwardly from the mixing table for engagement with a flow control orifice in the flow characterizing head, and by delivering a jet of water through the orifice and onto the valve element to aspirate the concentrate through the valve and scavenge the valve seat and valve element from solids.

A still further object of my invention is to provide a fluid dispenser for dispensing and diluting concentrates including a mixing and flow characterizing head constructed so as to have readily observable flow passageways for the delivery of water for mixing with the concentrate to enable sediment in the passageways to be cleaned therefrom.

A still further object of my invention is to provide a novel and improved form of mixing and dispensing valve for delivering measured quantities of concentrates, utilizing a permanent magnet as a spring to maintain the valve closed and an electric magnet to open the valve against the permanent magnet.

Another and important object of my invention is to provide a novel form of valve measuring uniform quantities of concentrates for mixture with water, including a new and improved form of flow-control diaphragm and cooperating valve element delivering uniform quantities of concentrate regardless of the head on the diaphragm.

A still further object of my invention is to provide a novel and improved form of flow characterizer automatically delivering uniform quantities of concentrates and including a flexible diaphragm having an aperture through its center and normally in a convex position with the convex portion thereof extending to face the concentrate flowing through the orifice of the diaphragm and having a spherical valve element movable into position to close the opening through said diaphragm and also operable to restrict the delivery area of the orifice upon movement of the diaphragm toward the valve as the head of concentrate on the diaphragm increases.

These and other objects of my invention will appear from time to time as the following specification proceeds and with reference to the accompanying drawings wherein:

Figure 1 is a fragmentary partial diagrammatic view in side elevation of a dispenser constructed in accordance with my invention with certain parts thereof broken away and certain other parts shown in section;

Figure 2 is a top plan view of a mixing and flow characterizing valve for the dispenser, operable to mix and deliver a uniform mixture of concentrated juice and water.

Figure 3 is a transverse sectional view of the mixing and flow characterizing valve shown in Figure 2 and taken substantially along line III—III of Figure 2, showing the valve in an extreme open position;

Figure 4 is a fragmentary transverse sectional view of the valve shown in Figure 2 and showing the orifice thereof partially restricted by the head of liquid on the diaphragm of the valve;

Figure 5 is a sectional view taken substantially along line V—V of Figure 3;

Figure 6 is a transverse sectional view showing a modified form of mixing and flow characterizing valve constructed in accordance with my invention, showing the valve in an extreme open position;

Figure 7 is a transverse sectional view of the valve shown in Figure 6, but showing the valve in a closed position;

Figure 8 is a partial horizontal sectional view taken substantially along line VIII—VIII of Figure 6; and Figure 9 is a diagrammatic view showing the electric circuit controlling operation of the dispenser.

As shown on the drawings:

In Figure 1 of the drawings I have shown a liquid dispenser for diluting juice concentrate to the normal consistency of the juice of the natural fresh fruit and delivering a cool uniformly mixed juice for drinking purposes. This dispenser is shown as including a casing 10 having a container or tank 11 for the concentrated juice mounted therein adjacent the upper end thereof and open to the top thereof. The tank 11 may be of a generally cylindrical form, closed by a cover 12 and having a sloping bottom 13. The bottom 13 leads to a discharge opening having a valve chamber 14 mounted therein, flush with the bottom thereof and depending therefrom.

The valve chamber 14 is herein shown as being of generally cylindrical formation having a flanged upper portion which may be recessed within the bottom of the tank 11 and welded or soldered thereto, and having an inverted frusto-conical open bottom portion converging to a delivery nozzle 15.

The delivery nozzle 15 is herein shown as leading through an overhanging horizontal wall 16 of the casing 10, spaced above the bottom thereof, for delivering mixed juice to a container 17 mounted on a bracket 18 extending from a vertical wall 19 of the casing 10. The bracket 18, besides serving as a support for the juice container, also serves as a drip plate for spilled juice, or for juice dripping from the nozzle 15, and has an inwardly projecting trough portion 20 extending through the wall 19 into the casing 10 and directing spilled or dripping juice into a suitable container (not shown) within said casing.

The casing 10 is also shown as having a compressor and motor for a refrigerating unit mounted therein and indicated generally by reference character 21. The compressor and motor 21 may be of any well known form and are herein diagrammatically shown as being contained in a unitary housing structure. A condenser 23 for the refrigerating unit is also shown. Cooling coils 24 are shown as encircling the tank 11 to maintain the juice concentrate at a temperature low enough to prevent bacterial growth and high enough so that the flow of the concentrate from the bottom of the tank will not be sluggish. A suitable temperature for the juice has been found to be from 30° to 32° F., although higher or lower temperatures may be used as long as the concentrate will flow relatively freely or is not warm enough for bacteria to breed, it being understood that the freezing temperature of the concentrate is much lower than that of water, the freezing temperature of concentrated fruit juices being in the neighborhood of 18° F.

A supply pipe 25 for diluting water is shown as entering the casing 10 through the wall 19 and as extending upwardly through said casing to a position adjacent the top of the cooling coil 24. The pipe 25 is then shown as being coiled around the outside of said cooling coil in spaced relation with respect thereto as indicated by reference character 26. Insulation indicated by reference character 27 extends around the cooling coil within the casing 10 to insulate said coil against heat and to act as a tempering influence and maintain the water at a uniform cool temperature above freezing, while the concentrate itself may be maintained at a temperature below freezing. The coil 26 is connected at its delivery end with a constant delivery solenoid-operated valve arranged to deliver a uniform volume of water upon the energization of a solenoid 29 controlling operation of said valve. The valve 28 may be of any well known form arranged to deliver a constant volume of water upon energization of a solenoid and is no part of my invention except insofar as it serves to control the volume of water delivered to be diluted with the juice concentrate, so need not herein be shown or described in detail. A pipe 30 leads from the discharge end of the water valve 28 to the top portion of the valve chamber 14 and is connected thereto by means of a fitting 31 extending through a wall 32 of said valve chamber and leading into said chamber to deliver water thereto.

It should be understood that the dispenser is generally made of metal and that a natural cooling effect is provided by the transfer of heat through the metal of the device, when in use, which of itself tends to prevent the breeding of bacteria.

The valve chamber 14 has an upper enlarged shouldered portion 33 forming a seat for a mixing and flow characterizing head 34 of the mixing and flow characterizing valve. The mixing and flow characterizing valve includes the mixing head 34 and a valve member 35 slidably mounted in said chamber beneath said mixing head for vertical movement with respect thereto. Said valve member is herein shown as having a generally cylindrical wall 36 with a recessed frusto-conical top portion 37 forming a mixing table for the water and concentrate. A semi-spherical valve 39 forms the top of a cone 40 which projects upwardly from the central portion of the table 37. Apertures 41—41 are provided at the base of said cone 40 to permit the flow of the mixed concentrate and water therethrough and through the nozzle 15. The valve member 35 may be made from a magnetic type of stainless steel which will be unaffected by the corrosive action of the juices. One such type of magnetic stainless steel which has been found to be satisfactory for the valve member 35 and which resists the corrosive action of the juices, including lemon juice, is a No. 430 Magnetic Type of Stainless Steel. Said valve member may be moved downwardly along the valve chamber 14 to open the valve by means of an electromagnet 42 encircling the valve chamber 14, and may be urged upwardly along said valve chamber to engage the valve element 39 with a central apertured portion 44 of an annular diaphragm 45 by means of a permanent magnet 43. The magnet 43 is herein shown as being of an annular form and as being recessed within the mixing and flow characterizing head 34, although it need not be recessed within said head and may even be separate from the head. The permanent magnet 43 may be made from "Alnico" or any other suitable alloy having high magnetic properties and retaining these properties over an almost indefinite period of time, and the magnet serves as a return spring for the valve, urging it into a closed position.

The mixing and flow characterizing head 34 is of a generally annular formation having a bridge 46 extending diametrically thereacross and is herein shown as being made of a plastic material, such as "Lucite," and as having the permanent magnet 43 molded therein. A hand grip 47 projects upwardly from the central portion of the bridge 46 to enable said mixing head to be readily removed from the valve chamber 14 for inspection or cleaning. The mixing head 34 has an annular passageway 48 extending therearound and opening to the periphery thereof. The passageway 48 communicates with the fitting 31 to supply water for mixing with the juice concentrate to the mixing table through downwardly directed angularly disposed passageways 49—49. The passageways 49—49 lead downwardly from said annular passageway 48 through the bottom of the mixing head 34. Said passageways are arranged to direct a plurality of jets of water onto the mixing table 37 in an angular direction with a whirling action to mix with the juice concentrate flowing through the orifice 44 of the diaphragm 45.

Two vertically spaced sealing rings 51—51 are mounted in corresponding grooved portions of the mixing head 34 on opposite sides of the annular passageway 48 to seal off the passageway 48 and to prevent leakage of liquid along the inner wall of the valve chamber 14. The annular grooves within which the sealing rings 51 fit should be sufficiently large to enable thorough cleaning thereof.

A diametral passageway 52 of smaller cross-sectional area than the annular passageway 48 extends through the bridge 46 and connects opposite sides of said annular passageway together. A jet nozzle 53 depends from the center of the bridge 46 and has a passageway 54 therein directed at an angle to discharge a high velocity jet of water through the orifice 44 onto the valve element 39. Since the cross-sectional area of the diametral passageway 52 is less than the cross-sectional area of the annular passageway 48, a Venturi effect is obtained, resulting in the discharge of a high velocity stream of water onto the valve element 39, scavenging said orifice and valve element from pulp and foreign matter and also aspirating the concentrate through the orifice 44. This insures a uniform discharge of all of the concentrate from the juice concentrate tank 11 and a clean non-clogging discharge valve leading from said tank.

The diaphragm 45 may be formed from a suitable resilient material such as rubber, neoprene, or any other similar material and is shown in Figures 3 and 4 of the drawings as extending within the open portion of the head 34 and as being molded in a convex form with its periphery in the form of a segment of a sphere. The diaphragm 45 has an upright annular flange 55 adjacent its periphery which is recessed within an inwardly extending lower shouldered portion 56 of the inner wall of the mixing head 34. Said diaphragm likewise has an angularly extending flanged portion 57 extending upwardly along the bottom of the frusto-conical bottom wall of the mixing head 34 and forming a sealing and gripping member, enabling the ready removal of said diaphragm by hand. When engaged by the valve element 39, said diaphragm, besides having its orifice closed by said valve element, also serves to cushion the valve member 35 upon upward movement thereof.

Referring now to Figures 3 and 4, it will be observed that when the electromagnet 42 is energized the valve element 39 will move downwardly to fully open the orifice 44 of the diaphragm 45 and to permit the flow of juice concentrate therethrough. As, however, the head of concentrate on the diaphragm 45 is increased, the central portion of said diaphragm will move toward the valve element 39 as shown in Figure 4. This will restrict the discharge area of the orifice 44, maintaining the volume of concentrate discharge uniform, regardless of any increase in head on the juice concentrate. The diaphragm 45 has sufficient resiliency that when the head on the juice concentrate is reduced, said diaphragm will move back toward its initial position, as shown in Figure 3, allowing the free flow of concentrate and water through the orifice of said diaphragm.

Referring now to Figure 9, schematically showing a simple electric circuit controlling operation of the valves 28 and 35, a push button 59 may be mounted in a convenient location on the front wall of the casing 10. A conductor 60 may connect one terminal of said push button to one terminal of the electromagnet 42. A lead-in wire 61 connected with a source of electric power may be connected with the other terminal of the push button 59. The other terminal of the electromagnet 42 may be connected with one terminal of the electromagnet 29 through a conductor 62. The other terminal of the electromagnet 29 may be connected with a source of electric power by a lead-in wire 63. Thus, when the button 59 is depressed, a circuit is closed through the terminals of the switch 15 to energize both electromagnets 29 and 42. This will open the constant volume flow control valve 28 to supply a constant volume of water to the annular passage 48 of the mixing head 34. It will also move the valve member 35 to a lowermost position with respect to the valve chamber 14 and open the orifice 44 for the flow of concentrate therethrough. The push button 59 may be depressed until the desired quantity of uniformly mixed beverage enters the container 17, and may then be released to allow the permanent magnet 43 to close the orifice 44 by attracting the valve member 35 and moving the valve element 39 into engagement with said orifice.

When the push button 59 has been depressed to open the orifice 44 for the flow of concentrate and water therethrough, the jet issuing from the passageway 54 will play upon the orifice 44 and valve element 39 with a high velocity stream of water aspirating the concentrate through said orifice onto the mixing table 37. At the same time a plurality of angularly disposed streams of water will be discharged onto the mixing table 37 with a whirlpool action, mixing with the concentrate and forming a uniform mixture of concentrate and water discharged through the apertures 41—41 and out through the nozzle 15. The recessed frusto-conical surface 37 thus forms in effect a mixing table onto which both the concentrate and the water are flowed together and mixed, causing a thorough mixing of the concentrate with the water. Also, as the head of the concentrate decreases, the orifice 44 will gradually move away from the valve element 39, controlling the volume of concentrate passing through said orifice by opening said orifice wider for the lesser head of concentrate and effecting a uniform delivery of concentrate, mixing with a uniform volume of water supplied by the flow control valve 27.

In the form of my invention illustrated in Figures 6, 7 and 8, I have shown a mixing and flow characterizing head 34a having an annular permanent magnet 43a recessed therein which is much like the mixing head 34 except water discharge passageways 49a—49b adjacent the outside of the mixing head discharge substantially vertically instead of at an angle, and the mixing head has a flexible diaphragm 45a which is formed from a substantially flat annulus deformed to a convex form. The diaphragm 45a has an orifice 44a through its center and is mounted in an inwardly facing annular groove 65, herein shown as having a substantially vertical inner wall. The side or top and bottom walls of said groove diverge at equal angles from the inner wall of the groove at predetermined angles to give a maximum operating efficiency of said diaphragm, both while acting as a valve seat and while controlling the flow of liquid through its orifice 44a. As herein shown, the side walls of said groove diverge at angles of 5° from the horizontal, forming the diaphragm into a convex form, the convex portion of which extends upwardly into the annular central portion of the mixing head 34a. When the diaphragm 44a is in this position, the outer peripheral edge of the diaphragm is against the vertical inside wall of the annular groove 63 at an angle to said wall, thus permitting said diaphragm to be free to move downwardly by the head of the juice concentrate thereon and to pivot like a hinge at the far right-hand lower corner of the groove. The inclined surface of the top wall of the groove serves to hold the diaphragm from swinging upwardly beyond the point of maximum opening.

It should here be understood, however, that the diaphragm 45a is placed under sufficient compression in the groove 65 so that it is always in a convex position with respect to the flow of liquid through the diaphragm and will never go into a reverse concave position. The diaphragm, however, is free to move from an uppermost position, such as is shown in Figure 6, toward the spherical valve element 39a, as the head of concentrate increases, to provide a uniform flow of the concentrate regardless of the head thereon, but will never pivot to a position which will close the valve by the head of the concentrate thereon. It is, of course, understood that the control of the flow of concentrate through the orifice of said diaphragm is effected by cooperation with the valve element 39a in the same manner as with the diaphragm shown in the form of my invention illustrated in Figures 3 and 4.

A valve member 35a is shown in Figures 6 and 7 as being made from a transparent plastic, such as "Lucite," and has a cylindrical wall portion 66 slidably guided along the inner wall of the valve chamber 14 for vertical movement with respect thereto. A cylindrical ring 67 of magnetizable material, such as "Armco Iron" is shown as being molded within the wall portion 66. Said ring may be attracted by an electromagnet 42a encircling the valve chamber 14 to open the orifice 44a of the diaphragm 45a and allow the juice concentrate to flow therethrough in the same manner as the valve member 35.

The valve member 35a likewise has a recessed generally frusto-conical top portion 69 forming the mixing table for the concentrate and water and having an annular ring 70 of a relatively flat generally frusto-conical formation recessed therein. The ring 70 may likewise be made from magnetizable material such as "Armco Iron." The permanent magnet 43a is molded within the mixing and flow characterizing head 34a to attract the valve member 35a and engage the valve element 39a thereof with the orifice 44a of the diaphragm 45a and block the flow of liquid through said diaphragm when the electromagnet 42a is deenergized. The valve member 35a has a central upright portion 71 having the semi-spherical valve element 39a projecting from the upper end thereof and has flow passageways 72—72 at the lowermost point of the mixing table. Integral molded vanes 73—73 extend from the central upright portion of said valve member to the wall 66 thereof and downwardly beneath said wall along the bottom of the chamber 14 into the nozzle 15 to still the whirling mixture of juice concentrate and water for discharge through said nozzle.

It may be seen from the foregoing that a new and improved form of dispenser has been provided which maintains a concentrate at temperatures high enough to allow the relatively free flow of the concentrate but low enough to insure against the breeding of bacteria therein and also maintains the water to be mixed with the concentrate cold, but at temperatures above freezing, and mixes a definite ratio of the water with a definite ratio of the concentrate and dispenses a cold juice of the consistency of juice of the fresh fruit from which the concentrate has been obtained.

It should here be understood that the dispenser of my invention may be used to dispense a wide variety of concentrates, other than juice concentrates, in the form of palatable drinks.

It may further be seen that the dispenser includes a simplified form of constant volume mixing and flow characterizing valve, mixing the water and concentrate by the whirling action of a plurality of streams of water flowing through the concentrate discharged through the valve orifice by the aspirating effect of a high velocity jet which also scavenges the orifice and valve from solids.

It may also be seen that the valve chamber and mixing and flow characterizing valve, including the valve member and mixing head, are of a simplified construction arranged with a view toward avoiding all sharp surfaces, ledges or recesses where bacteria might breed and to enable ready cleaning thereof, and that the mixing head and valve element may readily be removed by hand without the use of tools, making it possible for all passageways therethrough to be readily cleaned and inspected, and insuring a clean mixing head; and that the mixing head, besides serving as a conduit for distributing and mixing the concentrate with water and as a seat for the concentrate valve, also cooperates with the concentrate valve to serve as a flow characterizer and insure a uniform delivery of concentrate.

It may also be seen that a simplified form of valve has been provided, eliminating all springs and the need for mechanical connections by the provision of a permanent magnet urging the valve into a closed position and an electromagnet selectively operable to open the valve.

It may still further be seen that a novel and improved form of a constant volume valve has been provided wherein the orifice of a flexible diaphragm forms a seat for the valve and wherein the diaphragm moving toward or away from the valve element assures a uniform delivery of liquid through the diaphragm orifice, irrespective of the head on the diaphragm.

It will be understood that modifications and variations may be effected without departing from the scope of the novel concepts of the present invention.

I claim as my invention:

1. In a constant flow valve, a valve chamber, a member in said chamber having an upwardly facing valve element thereon, a flow characterizing head seated in the upper portion of said chamber and having an open portion forming a flow passageway therethrough, a flexible diaphragm extending across the open portion of said head and having a central apertured portion disposed above and in direct alignment with said valve member, the head of liquid on said diaphragm moving said diaphragm toward or allowing it to move away from said valve element to reduce or enlarge the flow area through said diaphragm and provide a uniform flow through said diaphragm regardless of the head thereon, and a jet above said diaphragm directing an aspirating stream on said apertured portion of said diaphragm and mixing with fluid passing through said flow passageway and also scavenging said head and apertured portion.

2. A mixing and flow characterizing valve comprising a valve chamber, a member mounted in said chamber for movement therealong and having a semi-spherical valve element, a mixing and flow characterizing head seated in said chamber above said valve element and having an annular lower portion having a flexible diaphragm extending thereacross having a central orifice forming a valve seat adapted to be engaged by said valve element, a permanent magnet extending from said valve seat in one direction and biasing said valve element into position to close said orifice, an electromagnet spaced from said valve seat in an opposite direction from said permanent magnet and selectively operable to move said valve away from said seat, the head of liquid on said diaphragm varying the spacing between said orifice and valve element when said valve element is in an open position, and varying the flow area of said orifice in accordance wih the head thereon.

3. A mixing and flow characterizing valve comprising a valve chamber, a member mounted within said chamber for vertical movement therealong and having an upwardly projecting valve element, a mixing and flow characterizing head of a non-magnetic material seated in the upper portion of said chamber and having an annular lower portion having a deformable annular diaphragm extending thereacross, the open portion of which forms a valve seat adapted to be engaged by said valve element to prevent the passage of liquid through said head, said diaphragm also moving toward and from said valve element when said valve element is disengaged from said seat in accordance with the head thereon and cooperating with said valve element to effect a constant flow of liquid through said mixing head, a permanent annular magnet carried by said mixing head and biasing said valve element into engagement with said seat, and an electromagnet encircling said valve chamber and spaced beneath said valve seat and selectively energizable to open the valve against the pull of said permanent magnet.

4. In a mixing valve for juice concentrates, a valve chamber, a valve member mounted within said chamber for vertical movement therealong, a mixing and flow characterizing head seated in said chamber and having an open portion for the flow of juice concentrate therethrough and also having a valve seat therein adapted to be engaged by said valve member to prevent the flow of juice concentrate therethrough, a flow passageway within said mixing and flow characterizing head and discharging water from the bottom thereof adjacent the outer margin thereof, and another flow passageway communicating with said first mentioned flow passageway and disposed above said valve seat and of a reduced cross sectional area from said first passageway and having a discharge passageway leading therefrom to a position adjacent said seat to discharge water onto said seat and aspirate the juice concentrate though said mixing and flow characterizing head.

5. In a mixing and flow characterizing valve, a valve chamber, a mixing and flow characterizing head seated within said chamber and having an annular portion having an inner wall defining an opening therethrough and having a diaphragm extending across said opening, an orifice extending through the center of said diaphragm, a valve element in axial alignment with said orifice, said mixing head having a groove formed therein having an inner wall parallel to the inner wall of said mixing head and having opposite side walls diverging therefrom at predetermined angles with respect to said inner wall, said diaphragm being initially flat and said groove forming a mounting for said diaphragm and deforming said diaphragm into a convex from extending axially within the open portion of said mixing head and against the inner wall of said groove and pivoting like a hinge about the corner of said groove remote from the inner wall of said head for cooperation with said valve element to decrease the space between said orifice and valve and discharge area of said orifice upon the increase in head on said diaphragm, and said groove placing said diaphragm under sufficient compression to prevent distortion thereof in a reverse direction upon increases in head thereon.

6. In a mixing and flow characterizing valve, a valve chamber, the improvements comprising a mixing and flow characterizing head seated within said chamber and having an annular portion having an inner wall defining an opening therethrough and having a diaphragm extending across said opening, said diaphragm having an orifice extending through the center thereof, a valve spaced from said orifice for cooperation therewith, the inner wall of said mixing head having a groove formed therein, said groove having an inner wall substantially parallel to the inner wall of said mixing head and having opposite side walls extending therefrom, the inner of said side walls being inclined at an angle with respect to the inner wall of said groove, and said groove forming a mounting for said diaphragm and placing sufficient stress on said diaphragm to form said diaphragm into a normal convex formation extending along said inclined wall and into the open central portion of said mixing head, accommodating said diaphragm to distort itself to a substantially flat form upon increases in head thereon for cooperating with said valve element to decrease the discharge area of said orifice, but preventing said diaphragm from distorting itself in a reverse direction beyond a flat formation.

7. In a constant volume mixing valve, a valve chamber, a mixing head within said chamber having an open central portion for the flow of fluid therethrough, a valve element spaced from said mixing head, and a convexly molded flexible diaphragm mounted in the open portion of said mixing head and extending therein in a direction contra to the direction of flow of fluid therethrough, said diaphragm having a central apertured portion a wall of which forms a valve seat for cooperation with said valve element, means operable to bias said valve element to engage said seat and block the flow of fluid through said orifice, other means operable to move said valve element out of engagement with said seat, said diaphragm also restricting the discharge area of said orifice upon movement of said diaphragm toward said valve element when said valve element is in an open position, solely by the action of the head of liquid on said diaphragm.

8. A mixing and flow characterizing valve for juice concentrates comprising an open ended valve chamber, a member mounted within said chamber for vertical movement therealong and having an upwardly projecting valve element, a generally annular mixing and flow characterizing head seated in said chamber, for the flow of liquid therethrough, a flexible annular diaphragm extending across the open portion of said mixing head, the open portion of said diaphragm forming a valve seat, means biasing said valve element into engagement with said seat, a flow passageway for mixing fluid leading into said valve chamber, an annular passageway in said mixing head opening to the periphery thereof and communicating with said flow passageway, discharge passageways leading from said annular passageway and discharging liquid from the bottom of said head, a reduced area passageway connected at its ends to said annular passageway and disposed above said diaphragm, a discharge jet leading downwardly from said reduced area passageway and discharging a high velocity jet of mixing fluid onto said valve seat and valve element and aspirating the juice concentrate therethrough for mixture with the liquid discharge passageways leading from said annular passageway.

9. A juice mixing and dispensing valve comprising a valve chamber, a mixing and flow characterizing head seated in the upper portion of said chamber and having an open interior portion for the flow of juice therethrough, a flexible diaphragm extending across the open portion of said mixing head and having a central orifice forming a valve seat, a liquid passageway leading into said chamber, a reduced area liquid passageway extending across said head and communicating with said liquid passageway, a member within said chamber and having a valve element extending therefrom for engagement with said orifice and valve seat to block the passage of liquid through said head, means biasing said valve element into engagement with said seat, other means moving said valve element away from said seat against said biasing means, and a discharge passageway from said liquid passageway extending across said head in alignment with said orifice for discharging a high velocity jet of liquid through said orifice and onto said valve element.

10. A mixing and flow characterizing valve comprising an open ended valve chamber, a member guided within said chamber for vertical movement therealong and having a projecting semi-spherical valve element, a generally annular mixing and flow characterizing head seated in said chamber and having a flexible diaphragm extending across the open portion thereof, said diaphragm being of a convex formation directed against the flow of liquid through said head and having a central orifice forming a valve seat, means biasing said valve into engagement with said seat to block the flow of liquid through said head, other means moving said valve element away from said seat, and said diaphragm also effecting a uniform flow of liquid through said orifice when said valve element is out of engagement therewith irrespective of the head on said diaphragm by movement toward and from said valve element upon variation in the head on said diaphragm.

11. A mixing and flow characterizing valve comprising an open ended valve chamber, a member slidably guided within the lower portion of said chamber for movement therealong and having an upwardly projecting semi-spherical valve element, a generally annular mixing and flow characterizing head seated in the upper end of said chamber for the flow of liquid therethrough and having a deformable diaphragm extending across the open portion of said head, said diaphragm being of a convex formation and directed against the direction of the flow of liquid through said head and having a central orifice engageable by said valve element to block the flow of liquid therethrough, means biasing said valve element into engagement with said orifice, means selectively operable to move said valve element out of engagement with said orifice, and the head of liquid on said diaphragm moving said diaphragm toward said valve element when said valve element is out of engagement with said orifice and varying the flow area of said orifice commensurate with the head on said diaphragm and effecting a uniform flow of liquid through said diaphragm irrespective of the head thereon.

12. A mixing and flow characterizing valve comprising an open ended valve chamber, a member slidably guided within said chamber for movement therealong and having an upwardly projecting semi-spherical valve element, a generally annular mixing flow characterizing head seated in the upper end of said chamber for the flow of liquid therethrough and having a flexible diaphragm extending across the open portion of said head, said diaphragm being of a convex formation extending within the annular open portion of said mixing head against the flow of liquid through said head and having a central orifice engageable by said valve element to block the flow of liquid through said mixing head, a permanent magnet on said mixing head biasing said valve element into engagement with said orifice, means selectively operable to move said valve element away from said magnet out of engagement with said orifice, and the head of liquid on said diaphragm moving said diaphragm toward said valve element when out of engagement with said orifice, or permitting said diaphragm to move away from said valve element to vary the flow area of said orifice commensurate with the head on said diaphragm and to provide a uniform flow of liquid through said orifice irrespective of the head of liquid on said diaphragm.

13. In a constant volume mixing valve, a valve chamber, a mixing head within said chamber having an open central portion for the flow of fluid therethrough, a valve element spaced from said mixing head, and a convexly molded flexible diaphragm mounted in the open portion of said mixing head and having an outer flanged portion extending axially of said mixing head and recessed therein to secure said diaphragm to said mixing head, the convexity of said diaphragm extending within said open central portion of said mixing head in a direction contra to the direction of the flow of fluid therethrough, said diaphragm having a central apertured portion forming a flow orifice and a valve seat cooperating with said valve element, means biasing said valve element into engagement with said seat, to block the flow of fluid through said mixing head, other means moving said valve element against said biasing means out of engagement with said valve seat, and said diaphragm being deformable toward said valve element when said valve element is out of engagement with said valve seat by the head of fluid on said diaphragm, to restrict the discharge area of said orifice upon increases in the head on said diaphragm and provide a constant volume orifice regardless of variations in head of the liquid on said diaphragm.

14. In a constant volume mixing valve, a valve chamber, a valve element mounted within said chamber for movement therealong, an annular mixing head seated within said chamber, a flexible diaphragm mounted within the open portion of said annular mixing head and adapted to extend within the open portion of said mixing head in a direction contra to the direction of the flow of fluid therethrough, said diaphragm having a central apertured portion, a wall of which forms a valve seat for cooperation with said valve element, said mixing head being constructed from a non-magnetic material, and a permanent magnet carried within said mixing head and moving said valve element into position to close said orifice.

15. In a constant volume mixing valve, a valve chamber, a valve element mounted within said valve chamber for movement therealong, an annular mixing head seated within the upper portion of said chamber, a diaphragm extending within the open portion of said mixing head and convexly flexed to face in a direction opposite to the direction of flow through said mixing head, said diaphragm having a central apertured portion forming a flow orifice and also forming a valve seat for cooperation with said valve element, said mixing head being constructed from a non-magnetic material, a permanent annular magnet mounted within said mixing head and moving said valve element into position to close said orifice, a selectively energizable magnet moving said valve element into position to open said orifice, and the head of fluid on said diaphragm moving said diaphragm toward said valve element or allowing said diaphragm to move away therefrom to vary the flow area of said orifice upon variations in head on said diaphragm and providing a constant flow orifice regardless of variations in head thereon.

16. In a juice dispenser comprising a casing having a juice concentrate tank therein, a uniform volume valve, a valve chamber leading from the bottom of said tank, piping means leading from said uniform volume valve to said valve chamber, the improvements comprising a generally annular mixing and flow characterizing head within said chamber having a passageway extending therearound communicating with said water inlet passageway and having discharge passageways leading therefrom and discharging water from the bottom thereof, said mixing head having a valve seating member extending across the open portion thereof having a central orifice the wall of which forms a valve seat, a valve member in the lower portion of said chamber having a recessed top portion forming a mixing table having a central discharge area, and also having an upwardly projecting central valve element engageable with said valve seat, means normally moving said valve element into engagement with said valve seat, other means selectively operable to move said valve element away from said valve seat, and a restricted flow passageway in said mixing head connected at its ends with said flow passageway and having a downwardly directed jet leading therefrom, directing a high velocity stream of water on said valve seat and valve element and aspirating said concentrate onto said mixing table.

17. In a juice dispenser, a casing, a juice concentrate containing tank within said casing, a uniform volume flow control valve within said casing, an electromagnet operating said valve, a fluid connection to said valve to supply water thereto, a valve chamber leading from the bottom of said tank, an inlet from said valve to said valve chamber, a general annular mixing and flow characterizing head seated within said chamber and having liquid passageways therein communicating with said inlet and discharging water into said chamber from the bottom of said head, a resilient diaphragm extending across the lower open portion of said head and having a central orifice extending therethrough, a valve member mounted within said chamber beneath said mixing head and having a valve element projecting upwardly therefrom, a permanent magnet carried by said mixing head and normally holding said valve element in engagement with said orifice, an electromagnet encircling said valve chamber and selectively energizable to move said valve element away from said orifice, said diaphragm moving toward or from said valve element when said valve is open, and cooperating with said valve element to vary the delivery area of said orifice in accordance with variations in the head of the concentrate and supply a constant volume of concentrate irrespective of varying head conditions, and said mixing head also having a jet directed to deliver a high velocity jet of water through said orifice onto said valve element, and an electric circuit connected with said electromagnets and selectively energizable to effect simultaneous opening of both of said valves.

18. In a constant flow valve, a valve chamber, a member slidably mounted in said chamber for movement therealong and having a valve element thereon, a flow characterizing head seated in said chamber on the upstream side of said member and valve element and having a central open portion forming a passage for the flow of fluid therethrough, a flexible diaphragm extending across said open portion of said flow characterizing head and of a convex form with respect to the direction of flow through said head and extending in an upstream direction with respect to said valve element in spaced relation with respect thereto and having a central apertured portion forming a flow orifice disposed in direct alignment with said valve element, the head of fluid on said diaphragm moving said diaphragm toward said valve element, and accommodating said diaphragm to move away from said valve element to reduce or increase the flow area through said orifice and provide a uniform flow through said orifice regardless of variations in the head of fluid on said diaphragm.

19. A mixing valve comprising an open ended valve chamber, a mixing and flow characterizing head seated in the upper portion of said chamber and having an open central portion, a valve seat member carried by said mixing head in said open central portion and having an orifice leading therethrough, a member mounted within said chamber on the downstream-side of said valve element for movement therealong and having a central projecting valve element in direct alignment with said orifice for engagement therewith, an annular permanent magnet carried by said mixing head and encircling said central open portion and valve seat member and biasing said member and valve element carried thereby into engagement with said orifice in said valve seat member, and an electromagnet encircling said valve chamber and spaced on the down stream side of said valve element and selectively energizable to move said member and valve element away from said orifice against the bias of said permanent magnet, to open the valve.

References Cited in the file of this patent

UNITED STATES PATENTS

| | | |
|---|---|---|
| 465,013 | Bourdie | Dec. 15, 1891 |
| 486,501 | Phillippi | Nov. 22, 1892 |
| 1,038,527 | Coleman | Sept. 17, 1912 |
| 1,284,021 | Wright | Nov. 5, 1918 |
| 1,930,033 | Apple | Oct. 10, 1933 |
| 1,988,194 | Erlandsen | Jan. 15, 1935 |
| 2,219,408 | Benz | Oct. 29, 1940 |
| 2,371,891 | Hoffmann | Mar. 20, 1945 |
| 2,508,492 | Chase | May 23, 1950 |
| 2,522,898 | Sanborn | Sept. 19, 1950 |
| 2,561,922 | Hall | July 24, 1951 |
| 2,597,952 | Rosenlund | May 27, 1952 |

FOREIGN PATENTS

| | | |
|---|---|---|
| 23,396 | Germany | of 1883 |
| 212,570 | Germany | Aug. 5, 1909 |